United States Patent
Van Blaricom

[11] Patent Number: 5,101,794
[45] Date of Patent: Apr. 7, 1992

[54] INTERNAL COMBUSTION ENGINE

[76] Inventor: Terry M. Van Blaricom, 5525 Halbrent Ave., Van Nuys, Calif. 91411

[21] Appl. No.: 733,337

[22] Filed: Jul. 22, 1991

[51] Int. Cl.⁵ .................. F02M 51/06; F02B 33/38
[52] U.S. Cl. .................. 123/472; 123/65 BA; 239/585; 251/65
[58] Field of Search ....... 123/27 GE, 65 BA, 65 VD, 123/472, 527, 528, 65 VB; 251/65, 129.15; 239/585, 533.8

[56] References Cited

U.S. PATENT DOCUMENTS

| | | | |
|---|---|---|---|
| 1,967,069 | 7/1934 | Shoemaker | 123/65 BA |
| 3,738,578 | 6/1973 | Farrell | 251/65 X |
| 4,306,526 | 12/1981 | Schaub et al. | 123/65 BA X |
| 4,564,046 | 1/1986 | Lungu | 251/65 X |
| 4,617,904 | 10/1986 | Pagdin | 123/527 X |
| 4,865,001 | 9/1989 | Jensen | 123/27 GE X |

Primary Examiner—Tony M. Argenbright

[57] ABSTRACT

An two-cycle internal combustion engine that is particularly adaptable to the use of gaseous fuels. The engine is made suitable for running at high speed without an unwanted increase in pollution to the atmosphere through the use of a pressure differential of gasses as a closing force for the fuel injector valves.

1 Claim, 2 Drawing Sheets 5,101,794

INTERNAL COMBUSTION ENGINE

FIELD OF THE INVENTION

This invention relates to improvements in the internal combustion engine and more particularly to engines that have a power stroke on each revolution of the crankshaft.

BACKGROUND OF THE INVENTION

There have been numerous attempts in the prior art to provide a two-cycle engine for general use that is highly efficient, powerful, lightweight, and that emits a lowered amount of pollutants into the atmosphere. The following patents exemplify some of the advances made over the years to have two-cycle engines become more efficient and of greater utility.

- Mort U.S. Pat. No. 1,021,697; Anderson U.S. Pat. No. 2,504,243;
- Grant U.S. Pat. No. 1,409,093; Black U.S. Pat. No. 2,799,258;
- Cage U.S. Pat. No. 1,575,541; Webb U.S. Pat. No. 2,873,574;
- Crimmins U.S. Pat. No. 1,786,106; Hull U.S. Pat. No. 2,970,582;
- Bokemuller U.S. Pat. No. 2,113,979; Brown U.S. Pat. No. 3,340,855;
- Mallory U.S. Pat. No. 2,156,665; Brown U.S. Pat. No. 3,340,857;
- Nallinger U.S. Pat. No. 2,280,839; Morton U.S. Pat. No. 4,016,838;
- Carter U.S. Pat. No. 2,381,646.

Not withstanding the advances made, there still remains a requirement that the engines be made even more efficient, with a higher power-to-weight ratio and a lower emission of harmful pollutants.

SUMMARY OF THE INVENTION

The primary object of this invention is to provide an engine for general use that is particularly adaptable to gaseous fuels such as compressed natural gas, or hydrogen.

Another object of this invention is to provide an engine for general use that is extremely efficient and powerful for its size.

A further object of this invention is to provide an engine for general use that emits a substantially reduced amount of pollutants to the atmosphere.

Other objects and advantages of this invention will be pointed out in the detailed description appearing hereinafter.

DESCRIPTION OF THE PREFERRED EMBODIMENT

Figure 1:
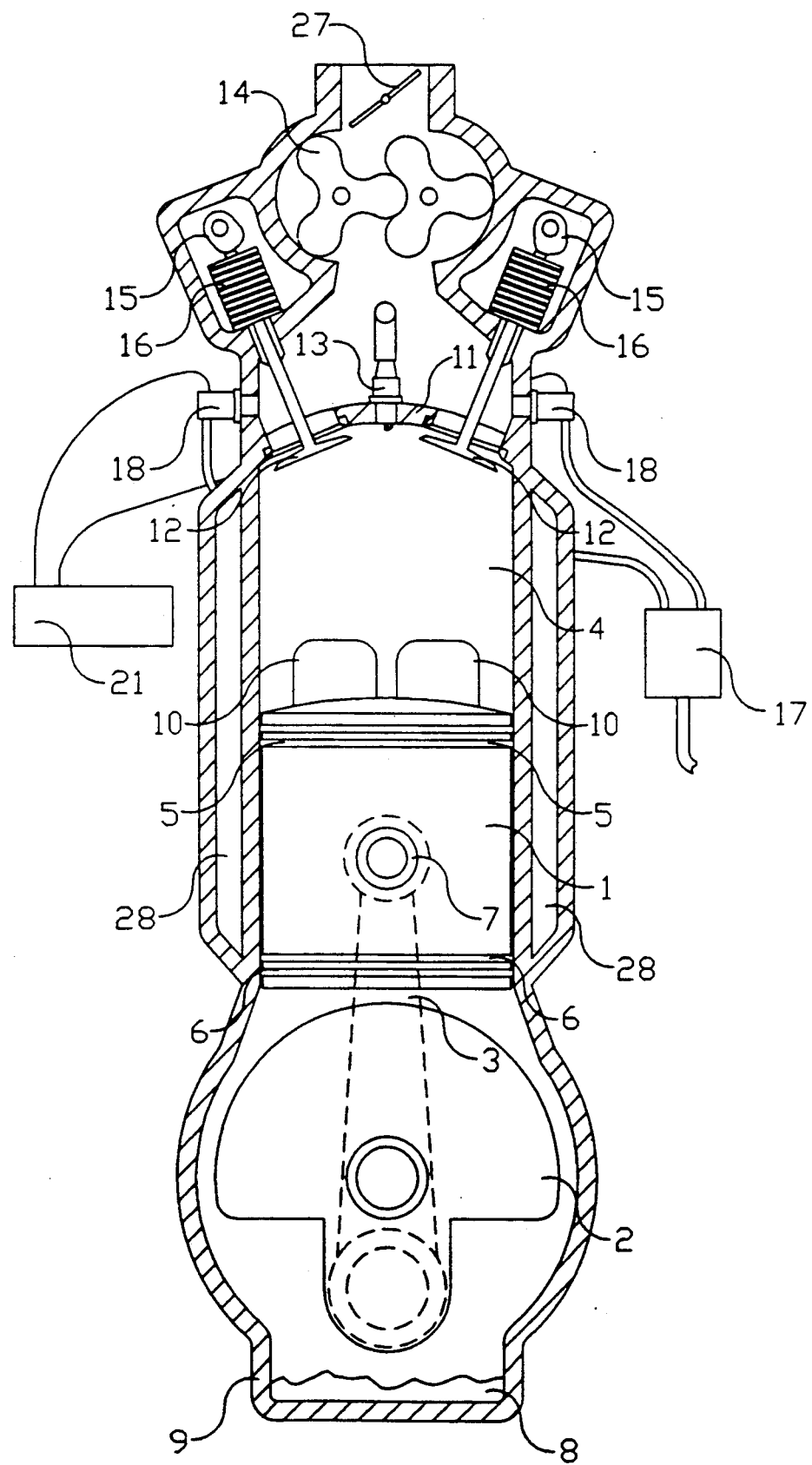
FIG. 1 is a cut-away view of an internal combustion engine in accordance with the present invention.
Figure 2:
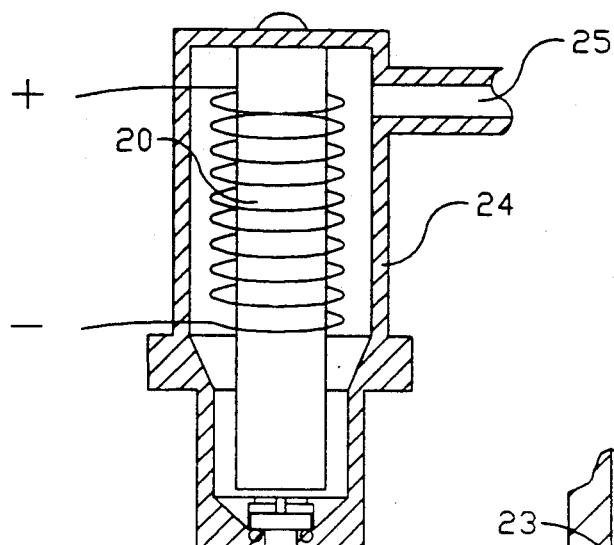
FIG. 2 shows an enlarged cut-away view of a fuel injector in accordance with the present invention.
Figure 4:
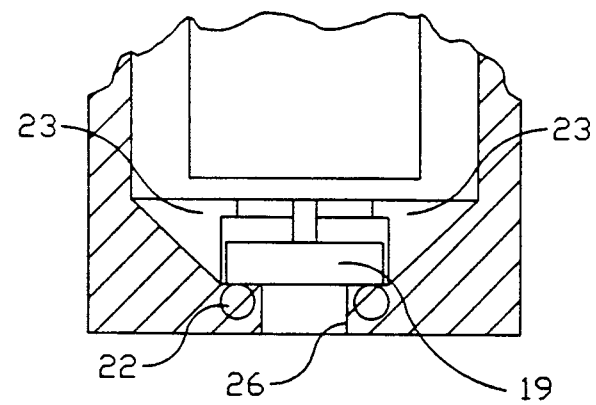
FIG. 4 shows a detail view of the lower portion of he fuel injector as shown in FIG. 2.
Figure 3:
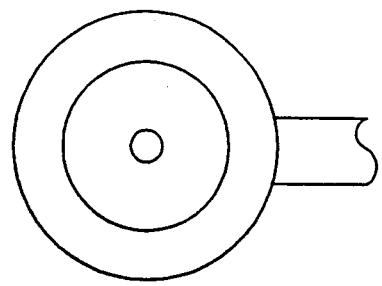
FIG. 3 shows a view from the bottom of the fuel injector shown in FIG. 2.

Referring to FIG. 1 of the drawings, a piston 1 driven by a crankshaft 2 and connecting rod 3 reciprocates within a cylinder 4. Compression sealing rings 5 are located near the top of the piston to contain the gasses within the cylinder when compression and combustion occurs. Oil sealing rings 6 are located near the bottom of the piston to prevent lubricating oil 8 in the crankcase from entering the combustion area. A wrist pin 7 connects the top portion of the connecting rod with the piston. Lubricating oil contained in the oil sump 9 is supplied to the plain bearings of the connecting rod, the plain bearings supporting the crankshaft, and the parts of the valve train by means of an oil pump. Cooling is effected by a water jacket 28 around the cylinder in concert with a radiator system as is common in the art. A plurality of exhaust ports 10 circumjacent to and in gaseous communication with the cylinder are fully opened by the movement of the piston when it reaches the bottom of its travel. A cylinder head 11 containing a plurality of intake valves 12 and a spark plug 13 is mounted at the top of the cylinder. An air compressor 14 supplies pressurized air to the cylinder through the intake valves. A throttle valve 27 controls the quantity of s id pressurized air to said cylinder. Cooling of the cylinder head and spark plug is partially effected by said pressurized air. Engine driven camshafts 15 and valve springs 16 control the opening and closing of the intake valves. A fuel pressure regulator 17 controls the pressure of the fuel that is supplied to the fuel injectors 18 by way of the fuel supply ducts 25. The fuel injectors meter fuel to the intake air stream by way of the fuel metering ducts 26. Said intake air stream carries the fuel to the cylinder by way of the intake valves. Two fuel injectors are used in this embodiment to provide a more equal mixture to the cylinder, however it is conceivable that a single fuel injector could be used. Fuel quantity is controlled by the length of time the fuel injectors are activated on each cycle. The fuel pressure regulator shown is of a fixed pressure type, however it is conceivable that said regulator could be of a variable type for additional control of the fuel quantity that is delivered to the engine. The fuel metering valves 19 of the fuel injectors are opened by the magnetic attraction of the solenoids 20, which consist of copper wound cores of magnetic material as is common in the art. Said solenoids are activated by a timed electrical current provided by the electronic fuel injector controller 21. The fuel injector shells 24 ar made of a non-magnetic material to prevent cross-circuiting of the magnetic flux. The fuel metering valve seats 22 are composed of an elastic material and provide sealing of the fuel metering valves. The fuel metering valve retainers 2 guide the fuel metering valves and provide a stop to keep said fuel metering valves from making contact with the solenoid cores. It is necessary to prevent said fuel metering valves from making contact with said solenoid cores to prevent sticking due to residual magnetism and to provide a space between the solenoid cores and the fuel metering valves where pressurized fuel may remain to effect the closing of the fuel metering valves.

In operation:

The compressed fuel/air mixture in the cylinder is fired by the spark plug as the piston nears the top-dead-center position in traveling upward. Crank inertia carries the piston past said top-dead-center position whereupon the piston is forced downward in the power stroke by pressure from the expanding gasses. As the piston nears a position in traveling downward that is ⅔ of the way from top-dead-center to bottom-dead-center, it effects the opening of the exhaust ports to initiate the escape of said expanding gasses. As the piston reaches the bottom-dead-center position of its travel, with the exhaust ports now fully open, the intake valve train effects the opening of the intake valves to admit pressurized air from the compressor into the cylinder for the purpose of purging the remainder of the spent gasses out through the exhaust ports. Crankshaft inertia carries the piston through the bottom-dead-center position to begin an upward movement. The purge of spent gasses by the pressurized air continues until the piston, in traveling upward, effects the closing of the exhaust ports as it nears a position that is ¼ of the way from bottom-dead-center to top-dead-center. Near said time of closure of the exhaust ports, fuel is metered into the intake air stream by the fuel injectors and carried through the still open intake valves to the cylinder. Fuel metering ceases after an appropriate quantity of fuel is delivered to the cylinder. As the piston nears a position that is ½ of the way from bottom-dead-center to top-dead-center in traveling upward, said intake valves are closed and compression of the fuel/air mixture begins. The pressurized air from the compressor is normally at about 2 times atmospheric pressure, therefore supercharging of the fuel/air mixture cylinder will occur from the time that the exhaust ports are closed by the piston to the time that the intake valves are closed by the intake valve train. At the time of closure of said intake valves, the compression of the fuel-air mixture is effected by the continuing upward travel of the piston and is once again fired by the spark plug as the piston nears the top-dead-center position, and thus the cycle continues.

In the present invention there is very little time available for the fuel injectors to deliver a proper measure of fuel to the cylinder, having to accomplish this in the time between the closing of the exhaust ports, and the closing of the intake valves. This is especially true at the higher engine speeds, where the time available between the closing of the exhaust ports and the closing of the intake valves is on the order of a few tenths of a millisecond. If the fuel injectors were to begin delivery of the fuel any earlier than at the closing of the exhaust ports, raw fuel would be carried out said exhaust ports by the later portion of the intake air stream that is used to purge the cylinder of spent gasses, causing an unburned hydrocarbons pollution of the atmosphere. If the fuel injectors were to continue the delivery of fuel after the intake valves had closed, then the fuel would remain in the space behind the intake valves until it again became time for the intake valves to open on the next cycle. The raw fuel would then be carried through the open intake valves to the cylinder in the earliest portion of the intake air stream, and would thus be carried out the exhaust ports in the purge cycle to pollute the atmosphere. An electronic fuel injector that is representative of the prior art normally uses a solenoid to attract magnetic material that is attached to or is a part of the fuel metering valve. When a sufficient quantity of the fuel is metered to the engine, the current to the solenoid is cut off and a metal spring returns the fuel metering valve to the valve seat to shut off the fuel flow. The speed of opening and closing of said fuel metering valve is largely a function of the inertia of the mass of the fuel metering valve and of the metal spring. If this injector that is representative of the prior art were used in the present invention it would open and close much too slowly at high engine speeds to allow the metering of a full measure of fuel in the few tenths of a millisecond that is available. This would be due to the high inertia of the mass that is the valve/spring system. In the present invention the mass of the fuel metering parts in a fuel injector is substantially lower than that in an injector of the prior art because the difference in pressure between the fuel in the injector body and the intake air stream is used to effect the closure of the fuel metering valve rather than a metal spring. The fuel in the fuel injector body is at a working pressure of about 100 psi, whereas the air pressure in the intake air stream is at about 30 psi. This pressure differential effects a closure of the fuel metering valve when current to the solenoid is cut off by the electronic fuel controller. Since the pressure of the fuel on the surface of the solenoid side of the fuel metering valve is substantially higher than the pressure of the gasses on the surface of the intake air stream side of the fuel metering valve, said fuel metering valve is forced against the fuel metering valve seat by said higher pressure to effect a closure of said fuel metering valve. Gaseous fuels such as hydrogen or methane, at 100 psi pressure, have considerably less mass than the metal spring that is used to effect a closure of the fuel metering valve in an injector of the prior art. Because of such low mass and corresponding low inertia, the fuel injectors in the present invention are able to operate at speeds that are sufficient to allow the metering of a full measure of fuel in the short time period that is available. The solenoid described herein uses an incomplete magnetic circuit to effect the movement of the fuel metering valve. A complete magnetic circuit would be used if a stronger magnetic force was needed, as in the case of a racing engine.

In the present invention fuel is injected into the intake air stream just behind the intake valves to help mix the fuel in the turbulence that takes place at the intake valve openings and to protect the fuel injector from the burning gasses, however it is entirely possible that the fuel could be injected directly into the cylinder. The fuel used in the present invention is of a gaseous type, however it is conceivable that a liquid fuel could be used. There would of course be an increase in the opening and closing times of the fuel injectors because of the increase in the mass inertia of the fuel. It is also within the scope of the invention that the opening and closing of the exhaust ports and of the air intake ports may be effected by any type of valving known in the art. The direction or type of cylinder scavenging, the type of air compressor used, and the means of ignition are also immaterial. Additional embodiments of the invention in this specification will occur to others, therefore it is intended that the scope of the invention be limited only by the appended claims and not by the embodiments described hereinabove. Accordingly, reference should be made to the following claims in determining the full scope of the invention.

I claim:

1. An internal combustion engine of the two-cycle type comprising; a cylinder, a piston slidable within said cylinder, a cylinder head to seal said cylinder at the top, thereby defining a combustion chamber, a crankshaft means to provide reciprocating motion to said piston, a lubricating means to lubricate said crankshaft, a sealing means around the bottom of said piston to prevent crankshaft lubrication from reaching said combustion chamber, a sealing means around the top of said piston to prevent combustion chamber gasses from escaping down the sides, a valving means to allow the escape of spent gasses from the combustion chamber, a separate valving means to allow the introduction of pressurized air into said combustion chamber, a compressing means to provide said pressurized air, an ignition means to ignite the fuel-air mixture in the combustion chamber, and an injecting means to provide fuel to said combustion chamber, said injecting means comprising: a fuel pressure regulator, an electronic fuel injector controller, a fuel injector, a fuel supply duct to carry pressurized fuel from said fuel pressure regulator to said fuel injector, said fuel injector comprising: a fuel injector body of non-magnetic material, a solenoid, a fuel metering valve of magnetic material, a fuel metering valve seat, a fuel metering valve guide, and a fuel metering duct, the opening of said fuel metering valve being effective by the magnetic attraction of said solenoid when activated by an electrical current, the closing of said fuel metering valve being effective when said current ceases by the pressure differential between the fuel that is inside the fuel injector body and the intake air that is outside said fuel injector body, the pressure of said fuel being substantially higher that the pressure of said intake air, which is in gaseous communication with said fuel by way of the fuel metering duct.

* * * * *